United States Patent
Dermer et al.

(10) Patent No.: US 6,515,763 B1
(45) Date of Patent: Feb. 4, 2003

(54) VIGNETTE RECOGNITION AND COMPRESSION

(75) Inventors: Richard A. Dermer, Issaquah, WA (US); Dennis Mercer, Auburn, NH (US); Stephan R. Yhann, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/127,548

(22) Filed: Jul. 31, 1998

(51) Int. Cl.[7] .............................................. G06F 15/00
(52) U.S. Cl. .................. 358/1.9; 358/538; 382/203; 382/284
(58) Field of Search .................. 358/1.9, 501, 515, 358/518, 523, 530, 532, 537, 538, 1.1, 1.4; 382/162, 164, 165, 241, 203–204, 242, 284

(56) References Cited

U.S. PATENT DOCUMENTS

| | | | |
|---|---|---|---|
| 4,805,117 A | 2/1989 | Fiore et al. | 345/433 |
| 4,809,065 A | 2/1989 | Harris et al. | 348/51 |
| 5,115,479 A | 5/1992 | Murayama | 382/241 |
| 5,134,688 A | 7/1992 | Corthout | 345/442 |
| 5,140,674 A | 8/1992 | Anderson et al. | 358/1.12 |
| 5,159,669 A | 10/1992 | Trigg et al. | 345/357 |
| 5,268,992 A | 12/1993 | Sasaki | 358/1.11 |
| 5,295,236 A | 3/1994 | Bjorge et al. | 345/434 |
| 5,613,046 A * | 3/1997 | Dermer | 358/1.9 |
| 5,636,337 A | 6/1997 | Boenke et al. | 345/435 |
| 6,020,897 A * | 2/2000 | Carlsen et al. | 345/435 |
| 6,141,462 A * | 10/2000 | Yoshino et al. | 382/284 |

* cited by examiner

Primary Examiner—Mark Wallerson
(74) Attorney, Agent, or Firm—Fish & Richardson P.C.

(57) ABSTRACT

A method of trapping objects for a page includes identifying sequential matching objects, combining into a larger object matching sequential objects including parameterizing each object as a band in the larger object and trapping non-matching objects and the larger object. In another aspect, a method of preparing a page to be printed is provided that includes receiving a page description language file describing the page to be printed, identifying sequential matching objects in the page description file that represent a gradient to be printed on the page and combining into a larger object matching sequential objects. The step of combining includes defining an outline for the object and a defining a function describing the coloring for the object.

13 Claims, 12 Drawing Sheets

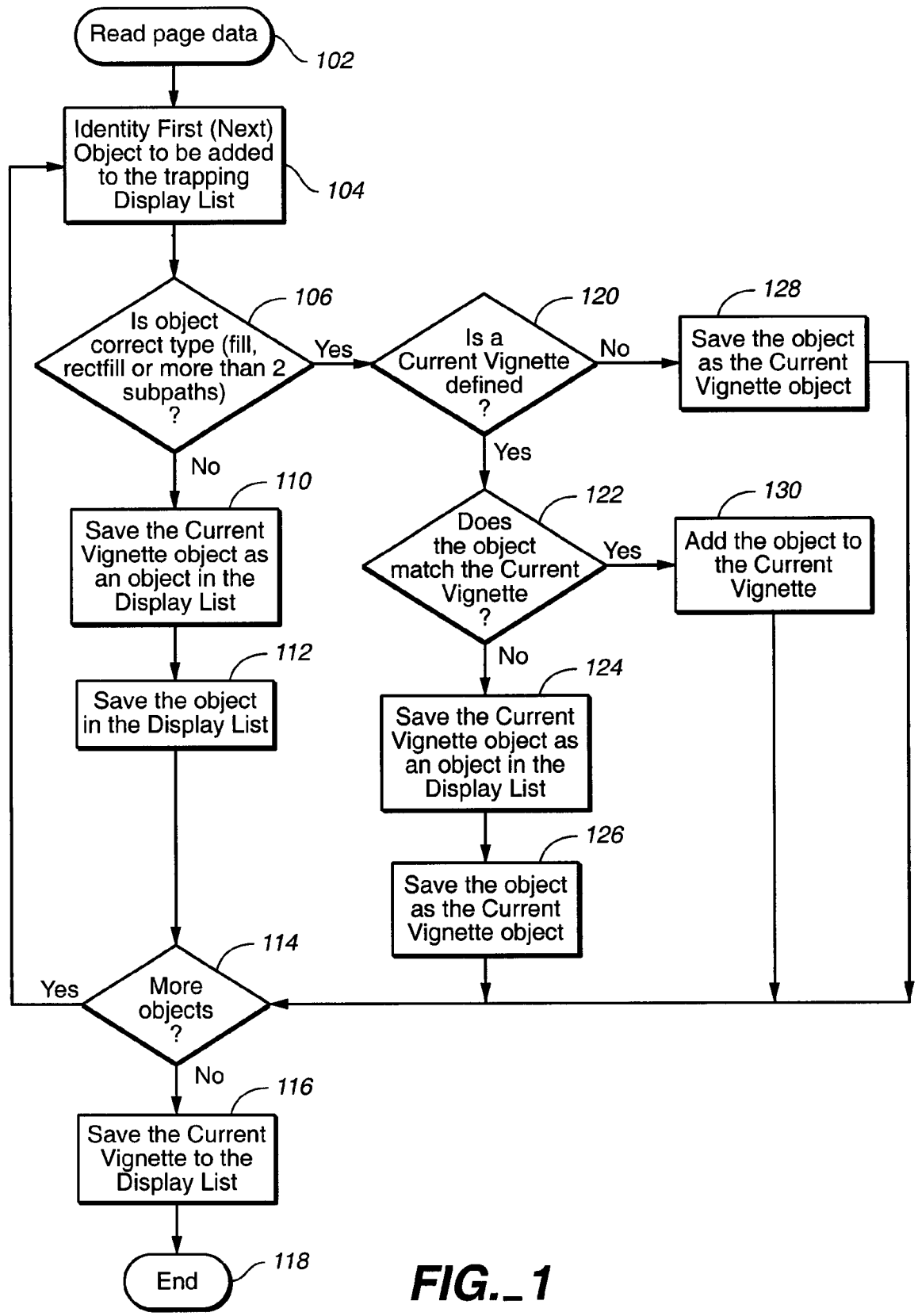
FIG._1

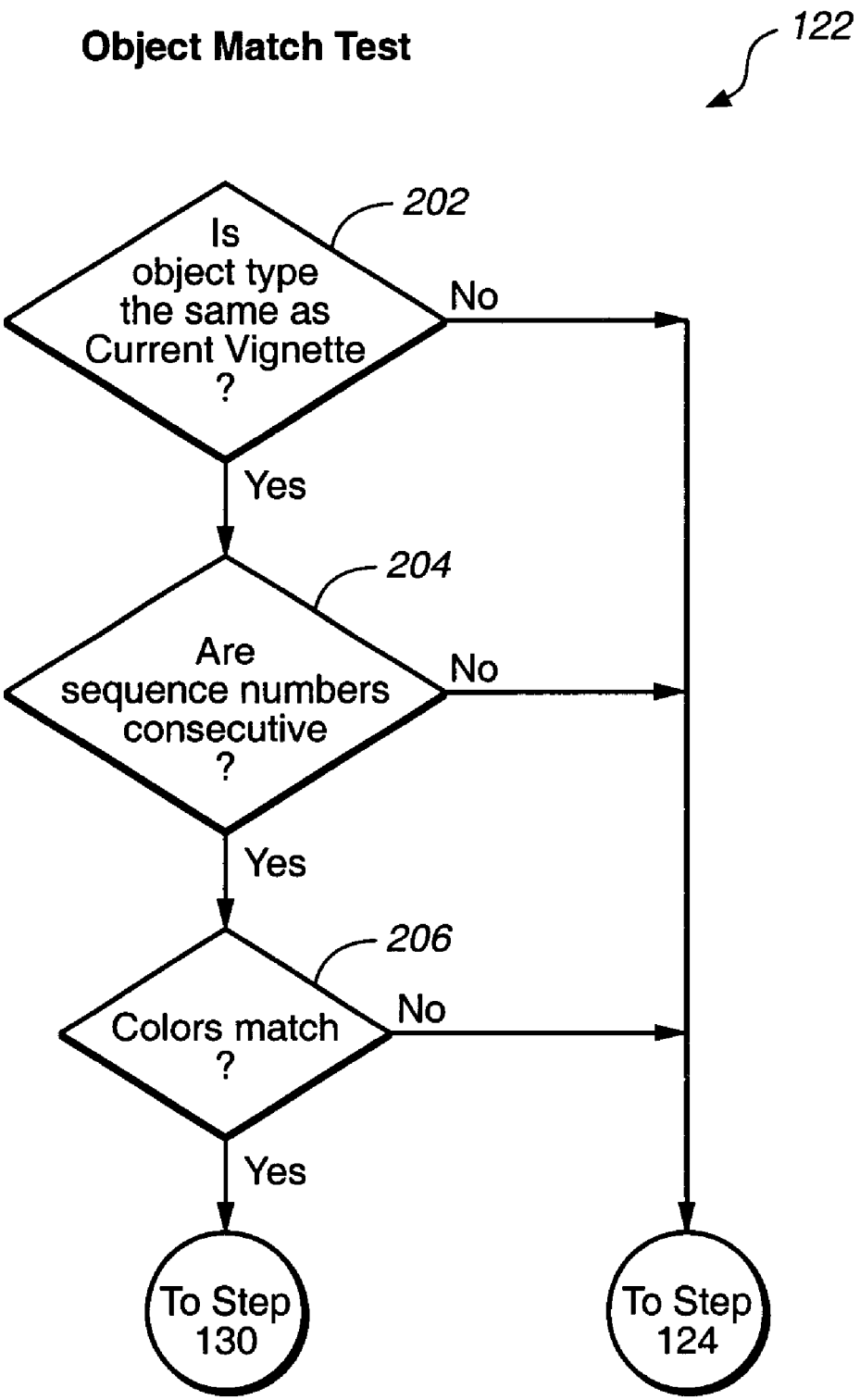
FIG._2

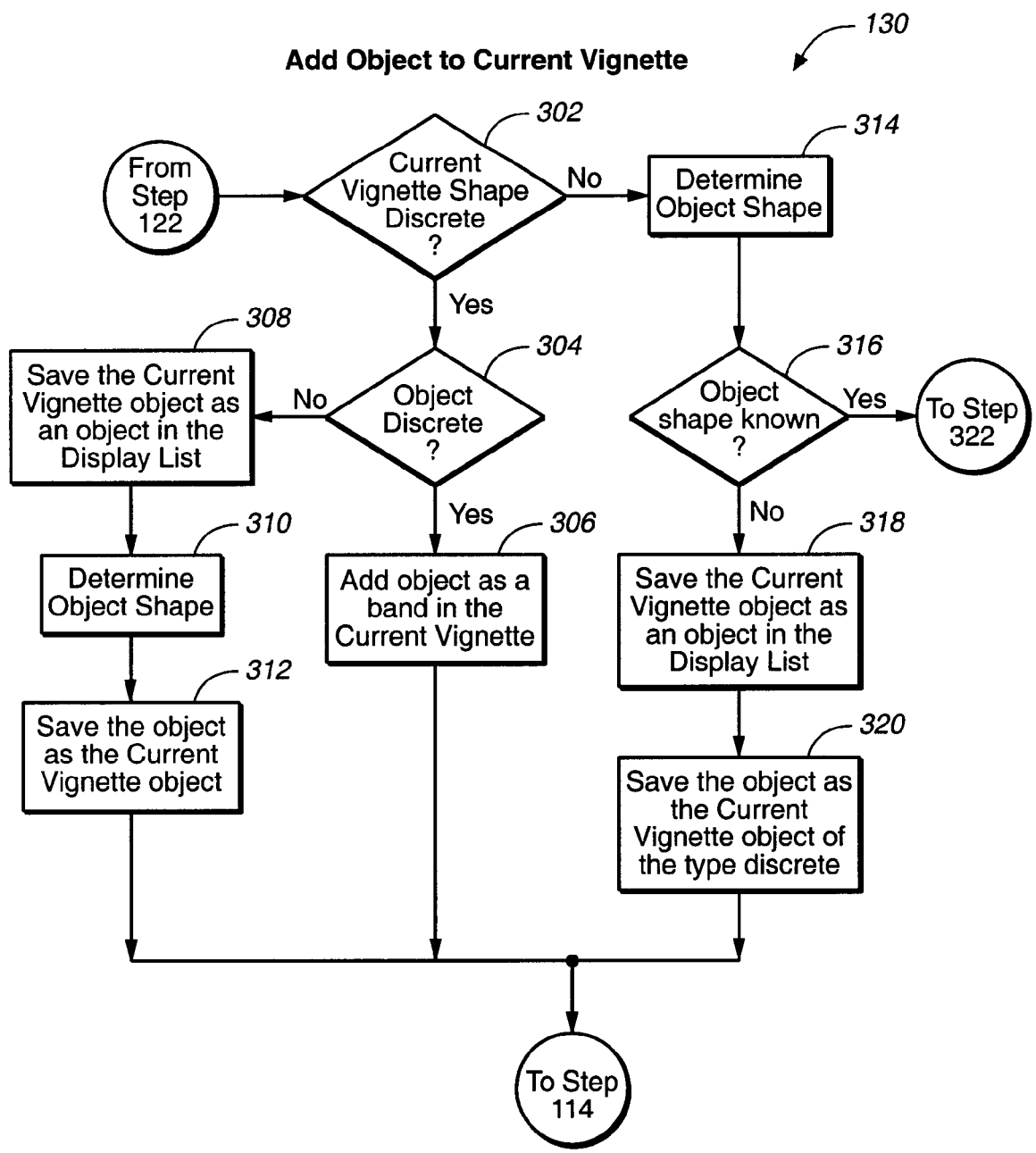
FIG._3a

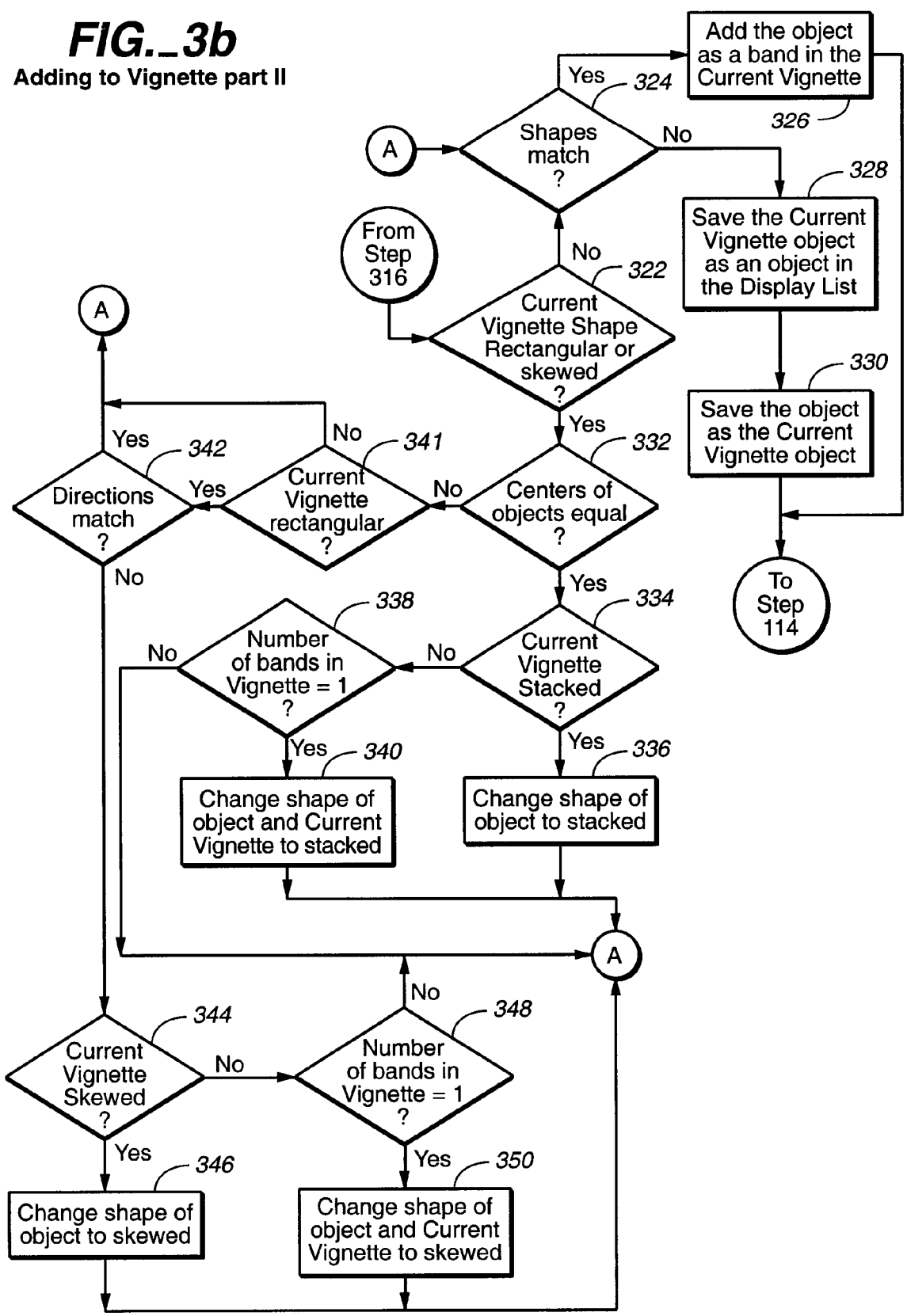
FIG._3b
Adding to Vignette part II

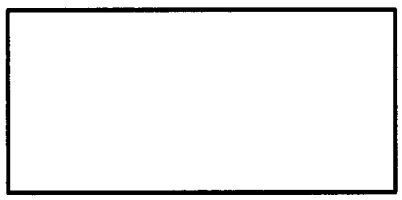
Rectangular Vignette
Skewed Vignette
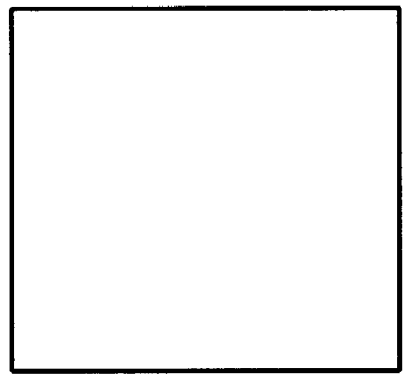
Stacked Vignette
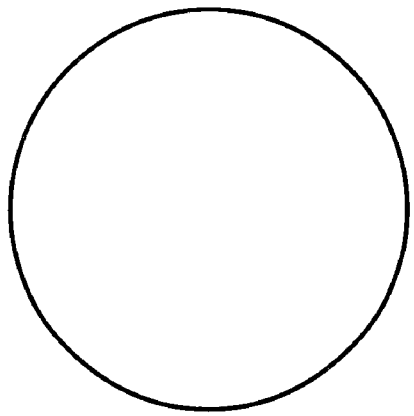
Circular Vignette
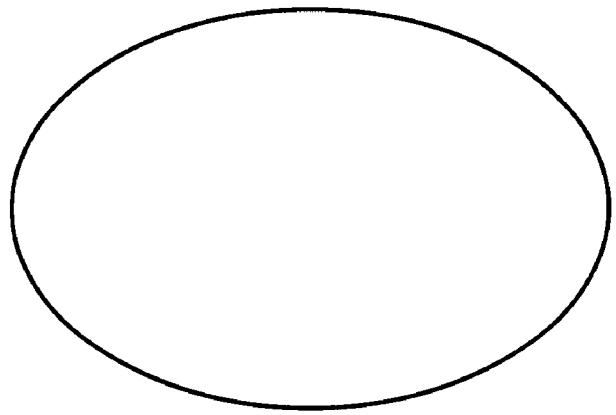
Elliptical Vignette
*FIG.\_3c*

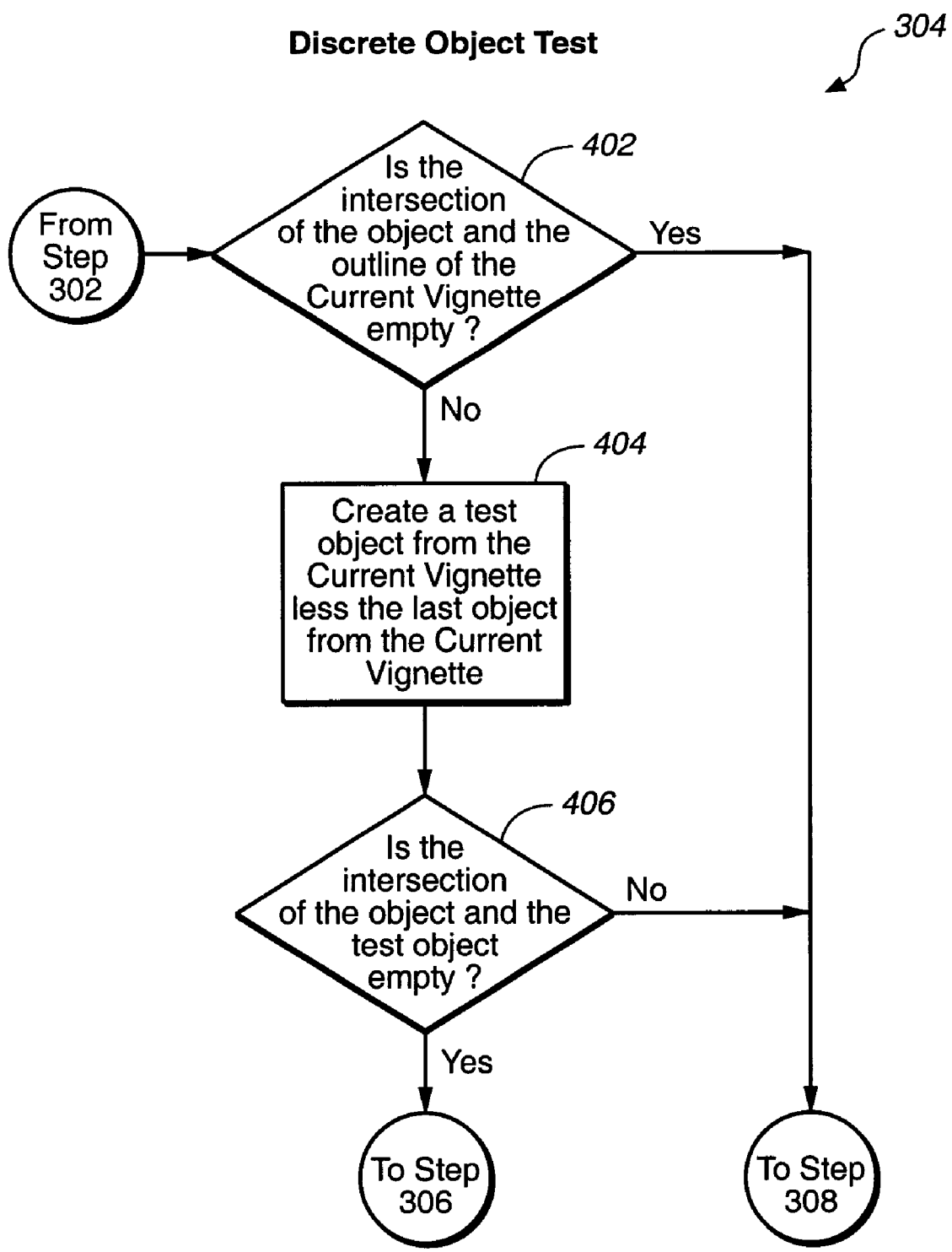
FIG._4

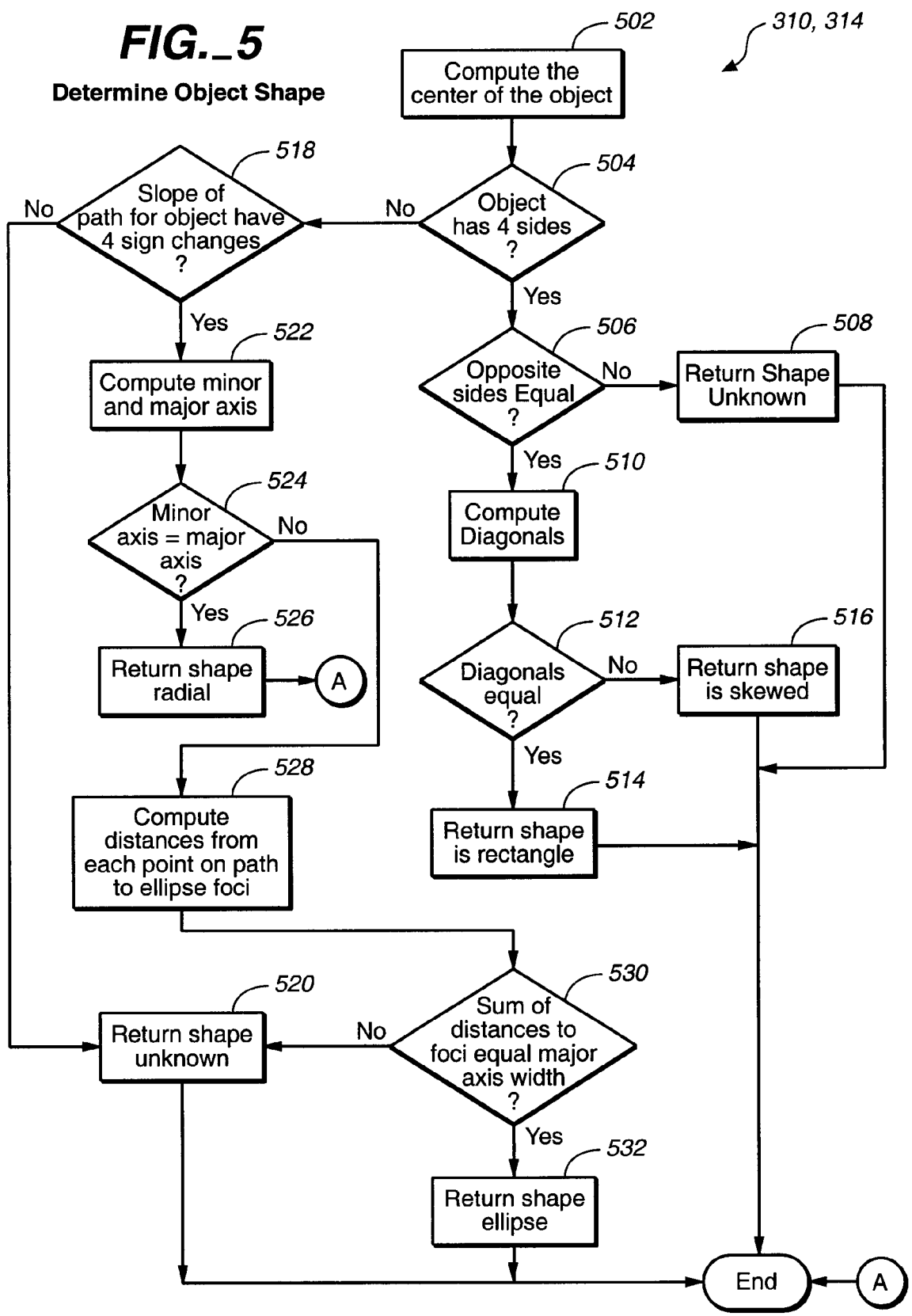
FIG._5
Determine Object Shape

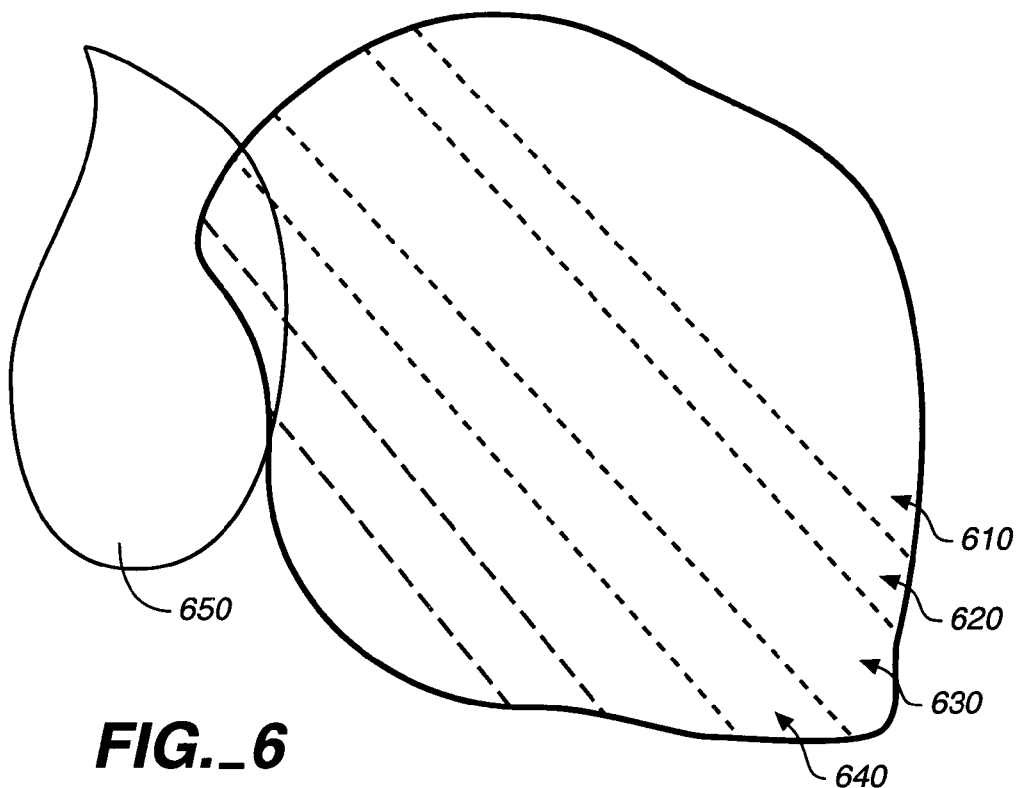
FIG._6
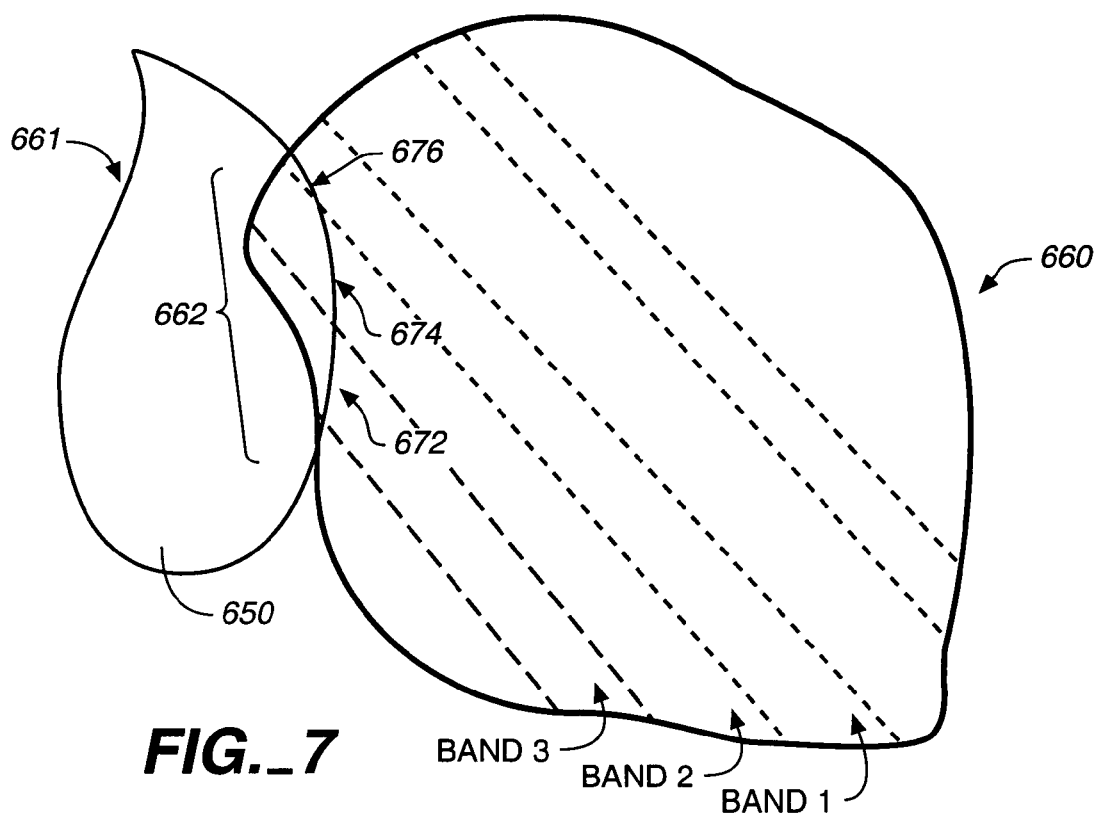
FIG._7

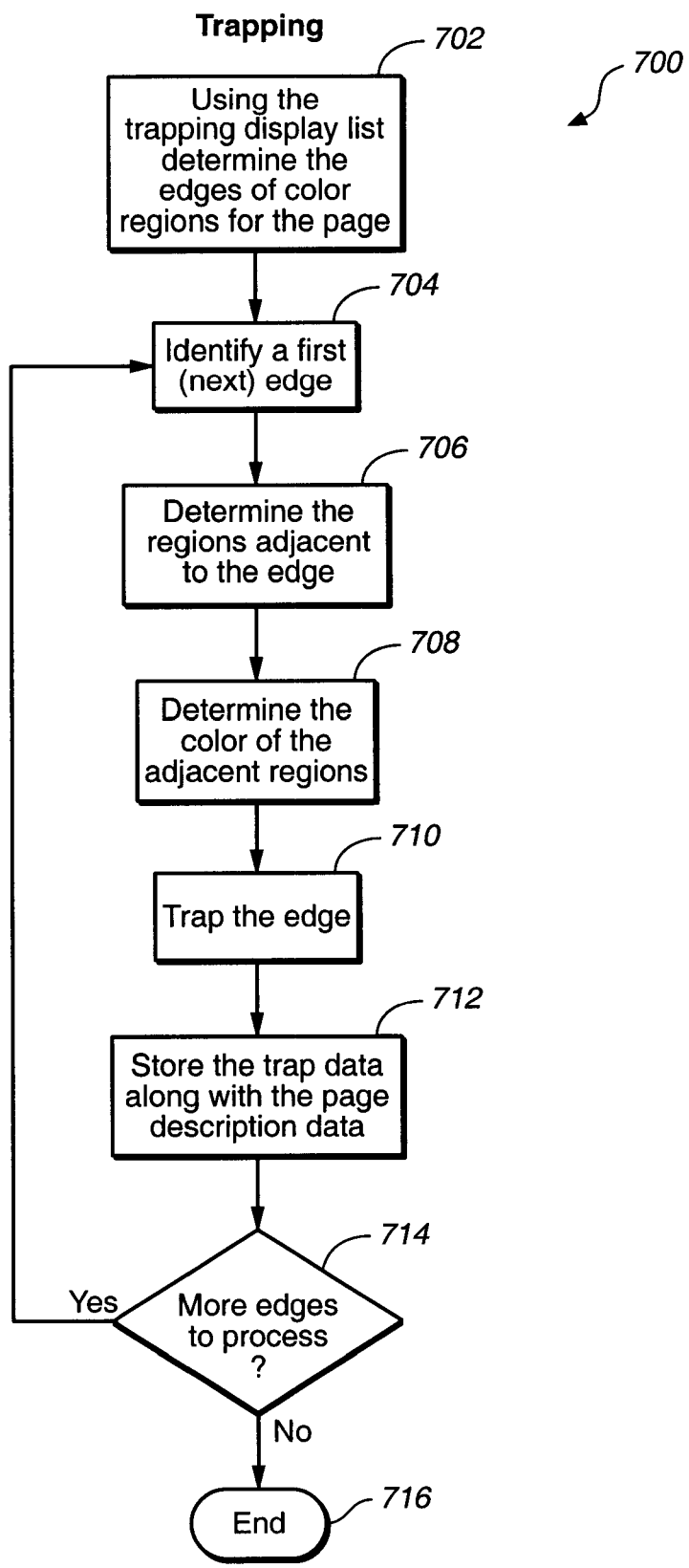
FIG._8

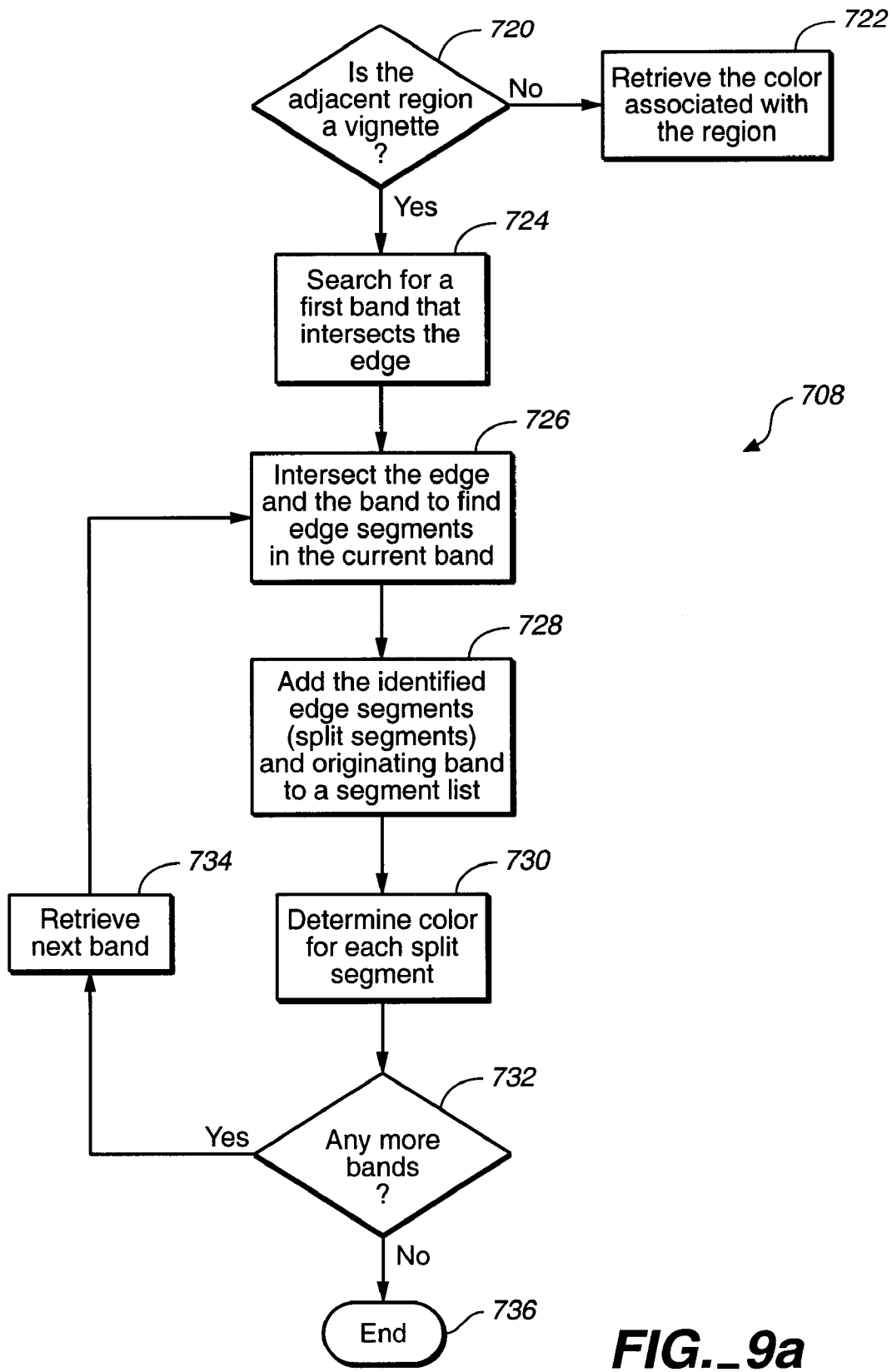
FIG._9a

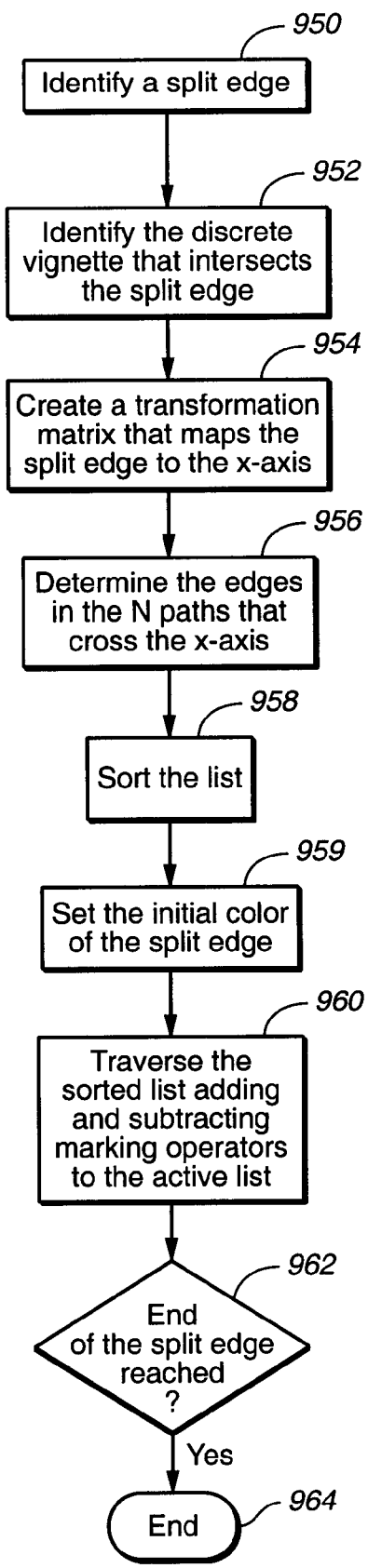
FIG._9b

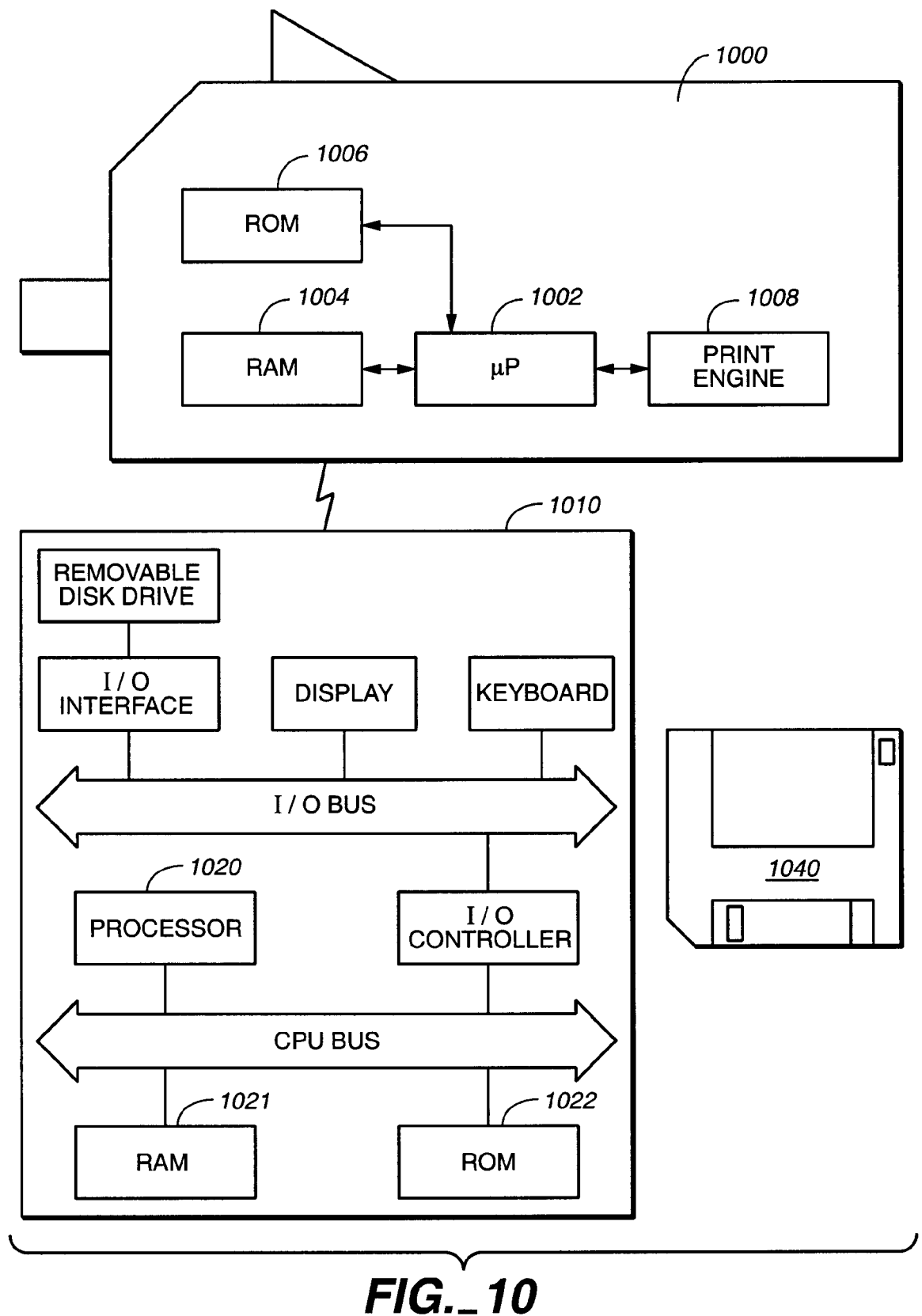
FIG._10

VIGNETTE RECOGNITION AND COMPRESSION

BACKGROUND OF THE INVENTION

The invention relates generally to methods and systems for printing computer generated images and more particularly to a methods and apparatus for processing page description language (PDL) instructions for a page in support of a printing process.

A computer system can output data to a wide variety of output display devices. Output display devices such as laser printers, plotters, image setters and other printing devices produce an image or "visual representation" on a piece of paper, a printing plate or the like. A printing device can print dots on a piece of paper corresponding to the information of a bit map or pixel map (where a pixel map is characterized as having a depth of two or more bits per pixel). As the use of desktop publishing increases, techniques for preparing and reproducing pages on a variety of output devices have been developed.

A page may include various types of objects, such as text, line art, and images, and its appearance is generally described by page description language instructions that are interpreted by an output device to create physical output having the desired appearance.

A color page additionally includes color data used in coloring the page. Colors are defined in accordance with a "color space," which provides a data representation for a range of colors (a "color gamut") in terms of basic color components. The specific color components depend on the color system used. For example, in the CMYK color system, colors are represented as combinations of cyan (C), magenta (M), yellow (Y), and key) (K) (generally black); in the RGB color system, colors are represented as combinations of red (R), green (G), and blue (B).

A color in the page is generally represented by a series of bits, with specific bits indicating the amount of each basic color component (colorant) used in the color. For example, a 24-bit RGB data representation may allocate bits 0–7 to indicate the amount of red, bits 8–15 to indicate the amount of green, and bits 16–23 to indicate the amount of blue.

These data representations of colors are used to create color separations, which in turn may be used by color output devices to produce the color page. Generally, each color separation corresponds to a color component of a color system used by the output device. For example, an image setter using a CMYK color system creates color separations for cyan, magenta, yellow, and black, with each separation indicating regions where the corresponding ink should be applied, as well as the amount of ink that should be applied.

Misalignment of separations can cause unintentional gaps or overlaps at edges of color regions in the output page. For example, at an edge separating two regions of different colors, misalignment may result in an output page having a gap between the two regions. At an edge separating a color region from a paper (no color) region, if the color is created from multiple separations, misalignment of those separations may result in an output page having one separation ink extending beyond the other separation ink for that color region.

To minimize the effects of misalignment, a trapping technique may be implemented. Trapping adjusts the shapes of color regions at edges by spreading (expanding) some separation color regions to prevent gaps, and choking (contracting) other separation color regions to prevent overlaps. The adjusted areas into which inks will be spread or from which inks will be contracted are referred to as "traps". Trapping also determines the amount of ink to be applied to the traps for each affected separation.

While trapping techniques improve the overall output image quality, the improvement is not without costs. Some trapping techniques operate on page description instructions to produce traps. Each object in a page description language file associated with an output image is processed by a "trapping engine" and all necessary traps are determined prior to printing. The trapping engine consumes resources (such as operating cycles) to process each object in the page description file. Accordingly, a longer delay in printing the page may result as the number of objects required to be processed by the trapping engine increases. Additional memory must be allocated to store the trap data for edges associated with each object. Again, as the number of objects processed increases so to do the storage requirements.

As described above a page may include various types of objects, such as text, line art, and images, and its appearance is generally described by page description language instructions that are interpreted by an output device to create physical output having the desired appearance. One type of object that may be a vignette. A vignette is a gradient defining a color or shading ramp to be applied to an object. Typically, page description instructions for defining a vignette include a plurality of individual objects each defining a band in the vignette. The objects are typically unrelated and must be processed individually by an interpreter within a printing device. Once interpreted, the sum total of the objects produce a shading or gradient effect which is applied to the page.

SUMMARY OF THE INVENTION

In general, in one aspect, a method of trapping objects for a page includes identifying sequential matching objects, combining into a larger object matching sequential objects including parameterizing each object as a band in the larger object and trapping non-matching objects and the larger object.

Aspects of the invention include numerous features. Identifying sequential matching objects includes determining if marking operators, colors and shapes for sequential objects match. Combining matching objects includes determining if shapes associated with the identified objects match. Each matching object is parameterized according to a set of parameters defining an outline of a given object. Trapping includes determining edges of other objects that intersect the larger object and for each intersecting edge splitting the edge into segments corresponding to band edges of the larger object to determine trap data. Combining matching objects includes storing the larger object as series of bands each band stored as a polygon and represented by a set of parameters including a distance, width, step and axis.

In another aspect, the invention provides a method of reducing the number and size of objects trapped for a page and includes identifying sequential objects that match and combining into a larger object the sequential matching objects prior to trapping including parameterizing each object as a band in the larger object.

In another aspect, the invention provides a method of trapping objects for a page by a trapping engine and includes receiving an object and comparing the object to a last object processed by the trapping engine. If the object and last object match, the object is added as a band to the last object creating a larger single object. Otherwise, the object is added to a trapping display list. Matching objects are added to the larger single object until a non-matching object is found and then the larger single object is added to the trapping display list.

In another aspect, the invention provides a method of preparing a page to be printed including receiving a page description language file describing the page to be printed, identifying sequential matching objects in the page description file that represent a gradient to be printed on the page and combining into a larger object matching sequential objects. The step of combining includes defining an outline for the object and a defining a function describing the coloring for the object.

Aspects of the invention include numerous features. The larger object can be stored as a smooth shading operator in the page description file.

In another aspect, the invention provides a method of trapping a page description file describing a page to be printed on an output device. Th method includes receiving a page description language file including a plurality of objects describing the page to be printed. Edges of the objects to be trapped are identified and stored in a list. Edges in the list that intersect a vignette object are identified. The edges that intersect the vignette object are split into edge segments corresponding to bands in the vignette object and added to the list. Finally the edges in the list are trapped.

In another aspect, the invention provides a method of trapping objects for a page including creating a vignette object from sequential matching objects and using the vignette object for trapping against other objects.

In another aspect, the invention provides a computer program, tangibly stored on a computer-readable medium, for trapping a page description file describing a page to be printed on an output device. The computer program includes instructions for causing a computer to create a vignette object from sequential matching objects and use the vignette object for trapping against other objects.

Advantages of the invention may include one or more of the following. A trap engine identifies vignettes defining a color or shading gradient ramp and stores the vignette as a single object. A vignette object can be used to represent a plurality of page description language objects for the purposes of trapping. The vignette can be compressed so that the color or shade at a point is represented by a function and not separate vignette slices. Each object making up a vignette can be stored as a polygon or can be parameterized to minimize storage requirements for the vignette. Colors for an object that intersect a vignette can be determined easily by splitting an intersecting edge of the object into segments that intersect no more than one band of the vignette object and thereafter determining a color associated with the intersection. Other advantages and features will become apparent from the description and from the claims.

BRIEF DESCRIPTION OF THE DRAWING

FIG. 1 is a flow diagram of a pre-processing phase for trapping in accordance with an implementation of the invention.

FIG. 2 is a flow diagram of a object match test according to the invention.

FIGS. 3a and 3b are flow diagrams of a process for adding objects to a current vignette.

FIG. 3c shows the known shapes of vignettes according to the invention.

FIG. 4 is a flow diagram of a process for determining if an object is discrete.

FIG. 5 is a flow diagram of a process for determining object shapes.

FIG. 6 shows a page including a plurality of objects to be pre-processed.

FIG. 7 shows a page including a plurality of objects to be trapped.

FIG. 8 is a flow diagram of a trapping phase according to the invention.

FIG. 9a is a flow diagram of a process for trapping objects that intersect a vignette object.

FIG. 9b is a flow diagram of a process for trapping objects that intersect a discrete vignette object.

FIG. 10 is a block diagram of a printer according to the invention.

DETAILED DESCRIPTION

The present invention may be embodied in any output device which receives page description data and produces from the data visual output for example on a sheet of paper. An output device may include a raster image processor for producing pixels maps (or bit maps, depending on the depth of the resultant data) from received data and one or more engines for producing images on any of a variety output media. The invention has particular applicability to printers, image setters and the like and will be described in terms of an implementation in such a device, which will be referred to simply as a printer.

Referring to FIG. 1, a page described by page data, such as PDL instructions, is trapped in two phases. Phase I (100) is a pre-processing phase for minimizing the number of objects to be trapped during Phase II (800 in FIG. 8), the trap data generation phase. In the pre-processing phase, vignettes which define a color ramp or gradient in the page are recognized and all the respective objects associated with the vignette are accumulated and stored as one vignette object, which can be trapped during Phase II.

At completion of Phase I (100), a trapping display list is produced that describes the page in terms of both page data (objects) and vignette objects. Phase II uses the page data and vignette objects in trapping operations for a specific output device and produces a page description for the page that includes trapping information.

Referring to FIG. 1 and the example illustrated in FIG. 6, Phase I (100) begins by reading page data (step 102), which includes data representation of the colors used in the page, defined in the page color space. A first object associated with the page is retrieved (step 104). For example, for a page including the adjacent color regions 610, 620, 630, 640 and 650 illustrated in FIG. 6, the object associated with region 610 is retrieved.

A test is made to determine if the object is of the correct type (step 106). In one implementation, each object includes type information including a marking operator. Marking operators that fill a region such as the PostScript® "fill" operator, "rectfill" operator or "Eofill" operator may be appropriate for combining with objects of a similar type that are located in physical proximity to each other.

If the object is not of a known type, then the current vignette object (if any) is saved as an object in a trapping display list (step 110). If this is the first object processed for the page, then no current vignette is defined and the process continues at step 112. The object, which was of an unknown type, is saved as an object in the trapping display list (step 112). A test is made to determine if any more objects are to be processed (step 114). If more objects are to be processed, then the Phase I process continues at step 104. For example, the object associated with color regions 620, 630, 640 and 650 illustrated in FIG. 6 are retrieved and pre-processed as described in accordance with Phase I.

If the object is of a known type, as determined in step 106, then a check is made to determine if a current vignette is defined (step 120). If no current vignette is defined, then the object is stored as the current vignette object (step 128) and the process continues at step 114. If a current vignette is defined, as set forth in step 120, then the object is checked to determine if the object matches the current vignette (step 122). If the object matches the current vignette, then the object is added to the current vignette (step 130), and the process continues at step 114. If the object does not match the current vignette, as set forth in step 122, then the current vignette object is saved as an object in the trapping display list (step 124) and the object is saved as the current vignette object (step 126). The process thereafter continues at step 114.

When all the objects on the page have been processed, the current vignette is saved to the trapping display list (step 116) and the trapping pre-processing phase ends (step 118). As described above, the trapping pre-processing phase (Phase I) accumulates adjacent regions that match creating a vignette object. that describes the shading over the adjacent regions.

Referring now to FIG. 2, a process for determining whether or not an object matches a current vignette object is shown. Step 122 includes a test to determine whether the object is the same type as the current vignette object (step 202). The object is the same type if the marking operator associated with the object is the same as, or equivalent to, the marking operator associated with the current vignette object. If the object type is not the same, then the process continues at step 124. If the object type is the same then the sequence numbers for the object and the last band added to the current vignette are checked (step 204). The creation of, and properties associated with, bands in a vignette are discussed in more detail below. If the sequence numbers are not consecutive then the process continues at step 124. If the sequence numbers are consecutive and if the colors for the object and the last band added to the current vignette match (step 206), then the process continues at step 130. If the colors do not match then the process continues at step 124. At each point in the matching process, a no-match condition results in the closing out and storage of the current vignette in the trapping display list and the creation of a new current vignette including the current object being processed. An object that satisfies all the constraints of the match test is added as a band of the current vignette object as described in greater detail below.

In one implementation, the color match test (step 206) determines whether or not the colors for the object and the last band of the current vignette object are sufficiently close. The colors are sufficiently close if the color value associated with the object and the current vignette object are different by no more than five percent (5%). Alternatively, other more or less tolerant constraints may be implemented.

Other matching tests may be performed to further restrict the types of different objects that may be combined. In one implementation, the clip path for the object and the current vignette is compared. Each object has an associated clip path. The current vignette may include an associated clip path that is derived from the clip paths from the objects used to construct the current vignette. The clip path for the current vignette may be stored in the vignette header. The data structure for a vignette is described in greater detail below. If the clip paths for an object and the current vignette do no match, then the object will not be added to the current vignette.

Referring now to FIGS. 3a, 3b and 3c, a process for adding an object to the current vignette (step 130 of the pre-processing phase) is shown. In one implementation, the process of adding an object to the current vignette includes an additional level of screening for objects to assure a match has been identified. The additional screening includes determining the shape of a given object. The shape determination process is resource intensive and accordingly is delayed to a last possible time in the pre-screening process. Objects whose shapes are not recognizable or whose shapes do not match the shape of the current vignette are not added to the current vignette. The location of a non-matching object triggers the closing out of the current vignette and the creation of a new current vignette including the non-matching object. Objects whose shapes match the current vignette are added as a band in the current vignette.

More specifically, the process for adding an object to the current vignette begins by determining if the current vignette shape is discrete (step 302). An object shape is discrete if it is not recognized as a known type. In one implementation, the shapes that are known include rectangular, skewed, circle (radial), ellipse and stacked. The known vignette shapes are shown in FIG. 3c. For the purposes of this disclosure, the shape of an object or vignette is the shape prior to applying a an associated clipping path to the given object. If the current vignette shape is not discrete then the shape of the object is determined (step 314). If the object shape is known (step 316), then the process continues at step 322 shown in FIG. 3b. If the object shape is not known, then the current vignette object is saved as an object in the trapping display list (step 318). Thereafter, the object is saved as the current vignette object of the type discrete (step 320) and the process continues at step 114.

If the current vignette shape is discrete, as determined in step 302, then the object is tested to determine if the object is discrete (step 304). The process of determining whether an object is discrete is described in greater detail below. Discrete objects may be combined to form a discrete vignette. If the object is discrete, then the object is added as a band in the current vignette object (step 306) and the process continues at step 114.

If the object is not discrete, as determined in step 304, then the current vignette object is saved as an object in the trapping display list (step 308). Thereafter, the shape of the object is determined (step 310) and the object is saved as the current vignette object (step 312). The process then continues at step 114.

Once the object shape is identified, the shape may be compared to the shape of the current vignette. Objects of the same shape may be combined in the current vignette as will be described below. In one implementation, the data structure for storing a current vignette includes band data associated with each object that is part of the current vignette. Band data includes, for each band, a band shape, color data and band number. A data structure for parameterizing the page description objects is described in greater detail below. In one implementation, the shape type of a band may change as subsequent bands are added to the current vignette. For example, the first band in a stacked vignette is initially identified as having a rectangular, radial, ellipse or other shape. After processing a second band in the vignette, the band shape may be changed to stacked reflecting the shape of the vignette region.

More specifically, FIG. 3b shows the continuing process for adding objects to a current vignette. If the object shape is known in step 316, then a determination is made as to whether the current vignette shape is rectangular or skewed (step 322). If the shape is not rectangular or skewed, then shapes of the object and the current vignette are compared (step 324). The shape of the current vignette is defined as the shape of the last band stored in the current vignette. If the shapes match, then the object is added as a band to the current vignette (step 326) and the process continues at step 114. Alternatively, if the shapes do not match, the current vignette object is saved as an object in the trapping display list (step 328), the object is saved as the current vignette object (step 330) and the process continues at step 114.

If the current vignette is rectangular or skewed, as determined in step 322, then the centers of the object and the current vignette object are tested (step 332). If the centers are equal, then a check is made to determine if the current vignette object shape is stacked (step 334). If the current vignette shape is stacked, then the shape of the object is defined to be stacked (step 336) and the process continues at step 324. If the current vignette is not stacked, as determined in step 334, then the number of bands in the current vignette are determined (step 338). If the number of bands in the vignette is equal to one, then the shape of the object and the shape of the current vignette object is changed to stacked (step 340) and the process continues at step 324. If the number of bands in the vignette is not equal to one, then the process continues at step 324.

If the centers of the objects are not equal, as determined in step 332, then the shape of the current vignette object is checked (step 341). If the current vignette is not rectangular then the process continues at step 324. If the current vignette is rectangular then the directions associated with the longest axis of the rectangular object and the current vignette are checked for equivalence (step 342). If the directions match then the process continues at step 324. If the directions do not match, then the current vignette shape is identified (step 344). If the current vignette is skewed, then the shape of the object is defined to be skewed (step 346) and the process continues at step 324. If the current vignette shape is not skewed, then the number of bands in the current vignette object are determined (step 348). If the number of bands in the current vignette object is equal to one, then the shape of the object and the current vignette is changed to be skewed (step 350) and the process continues at step 324. If the number of bands in the current vignette is not equal to one, then the process continues at step 324.

As shown in FIG. 4, a discrete object test is used to determine when a object of an unknown shape should be added to a current vignette that also has an unknown shape. If the discrete object test is satisfied, then the object may be added as a band into the current vignette (that is of the type discrete). If the test fails, then the current vignette is closed out and stored in the trapping display list while a new current vignette is created including the object.

Specifically, discrete object test 304 includes determining if the intersection of the object and the outline of the current vignette object is empty (step 402). The data structure for a vignette includes the storage of a path describing the outline of the vignette. An example of a method for constructing the path is described in greater detail in a commonly-owned U.S. patent application entitled "Generalized Shape Algebra Processing", application Ser. No. 08/923,037, filed Sep. 3, 1997, to Richard A. Dermer, the contents of which are expressly incorporated herein by reference. If the intersection is empty, then the process continues at step 308. If the intersection is not empty, then a test object is constructed from the current vignette object less the last object processed (step 404). That is, a path is constructed from all but one of the objects in the vignette. The last object added to the vignette is left out of the newly constructed path so that a check may be performed to determine whether the object intersects the current vignette at any location other than that associated with the last band processed. If the object intersects at other locations then the multiple intersections may not be able to be easily resolved. Accordingly, these type of objects may optionally not be added to the current vignette. If the intersection of the object and the test object are empty (step 406), then the process continues at step 306. If the intersection of the object and the test object are not empty then the process continues at step 308.

As shown in FIG. 5, in one implementation of a process for determining object shape, five object shapes are recognized, namely rectangle, circle, ellipse, skewed and stacked. The shape determination process begins by computing the center of the object (step 502). If the object has four sides (step 504), then the sides are tested to determine if the opposite sides are equal (step 506). If the sides are not equal, then the shape of the item is returned as unknown (step 508) and the process ends. If the opposite sides are equal as determined in step 506, then the diagonals associated with the object are computed (step 510). Thereafter, a check is made to determine if the diagonals are equal (step 512). If the diagonals are not equal then a shape of skewed is returned (step 516). If the diagonals are equal then a shape of rectangle is returned (step 514).

If the object does not have four sides, as determined in step 504, and if the slope of a path for the object does not have four sign changes (step 518), then a shape of unknown is returned and thereafter associated with the object (step 520). If the slope of the path has four sign changes, as determined in step 518, then the minor and major axes are computed (step 522). If the length of the minor axis equals the length of the major axis (step 524), then a shape of radial is returned (step 526) and the process ends. If the minor axis and the major axis are not equal then the distances from each point on a path around the object to theoretical ellipse foci are computed (step 528). If the sum of the distances to the foci equal the major axis width (step 530), then the shape of ellipse is returned (step 532). Otherwise, the shape of unknown is returned (step 520).

The data structure for storing a vignette includes a header and band data. The vignette header includes data describing the vignette origin, vignette shape and a counter indicating the number of bands in the vignette. The vignette shape is described by a path that is created (updated) as each object is added to the current vignette. The band data describes the band shape, location and includes color data associated with the band.

In one implementation, each band is parameterized to represent the band shape efficiently. Each vignette band is described by a set of parameters which are sufficient to capture the shape of the band (underlying object) and allow for the ease of computation when determining the intersection of other objects with the vignette.

Four parameters can be used to define the shape of a band of known object shape. The four parameters are distance, width, step and axis.

For rectangular shaped vignette objects: the distance parameter defines the centroid distance of the band from the origin of the vignette; the width parameter defines the length of the rectangle perpendicular to the vignette origin; the step parameter defines the dimension of the rectangle along the vignette direction; and the axis parameter defines the direction of the rectangle for the longest side of the rectangle relative to the origin.

For radial shaped vignette objects: the distance parameter defines the centroid distance of the band from the origin of the vignette; the width parameter defines the radius of the circle; the step parameter is always set to zero (0.0); and the axis parameter defines the direction from the origin of the vignette to the center of the circle.

For skew shaped vignette objects: the distance parameter defines the centroid distance of the band from the origin of the vignette; the width parameter defines the length of the parallelogram perpendicular to the vignette direction; the step parameter defines the length of the parallelogram along the vignette direction; and the axis parameter defines the direction of the long axis of the parallelogram.

For ellipse shaped vignette objects: the distance parameter defines the centroid distance of the band from the origin of the vignette; the width parameter defines the major axis length; the step parameter defines the minor axis length; and the axis parameter defines the direction of the long axis of the ellipse.

For stacked vignette objects: the distance parameter defines the direction of the long axis to the corner point of the stacked object; the width parameter defines the length of the long axis to the corner point; the step parameter defines the length of the short axis to the corner point; and the axis parameter defines the direction to the short axis to the corner point.

Vignettes having a shape of discrete are not parameterized. Polygons associated with each discrete band of the discrete vignette are stored along with the vignette header data. Header data for a discrete vignette includes an outline that defines the outline of the discrete vignette.

Color data for each band is stored along with the parameter values. In one implementation, a color code and color record are stored with each band. The color code describes the type of color (e.g. CMYK, or Spot). The color record stores the colorant value for each color plane that the vignette band is painted on (e.g., the color record may have a value for each of cyan, yellow, magenta and black (key) if the color code is CMYK).

Referring to FIGS. 7 and 8, Phase II of the trapping process operates on the trapping display list and generates traps for the page. More specifically, objects in the trapping display list are evaluated to determine the edges of color regions for the page (702). Various methods of identifying edges may be adapted for trapping. For example, U.S. Pat. No. 5,295,236, incorporated herein by reference, discloses one such method.

Depending on the method used, the trapping may identify all edges for an entire page or it may identify only a subset of edges. For example, the identified edges may be limited to specific areas of the page, or to specific edges, or to specific objects represented in the page. In the example shown in FIG. 7, object 650 includes a path that includes sub-paths 661 and 662. Sub-path 661 defines a portion of the path about the periphery of object 650 that is adjacent to the background of the page. Sub-path 662 defines the portion of the path about the periphery of object 650 that intersects vignette 660. Each sub-path may include one or more edges depending on the geometry of the sub-path. Here, where the sub-paths are not linear, a plurality of edges are included in each sub-path.

While identified edges remain to be considered, one such edge is retrieved (704) and its adjacent regions are identified (706). An adjacent region may be a color region, in which case the color, defined in the page color space, is also identified, or it may be a paper (no color) region.

For a color-paper edge separating a paper region from a region having a color including color components of a dark ink and at least one lighter ink, misalignment of the ink separations may be visually apparent at output if a lighter ink extends beyond the boundary of the dark ink into the paper region. The trapping solution chokes the lighter ink to ensure that even with slight misalignment, the lighter ink will not extend past the dark ink.

The color of the adjacent regions are determined (step 708) and the edge is trapped producing trapping data (step 710). Trapping includes comparing the colors of the identified adjacent regions of the edge, designating a dominant region and determining a clip region. Dominance may be based on a variety of factors and generally is used to predict which of a plurality of colors would visually dominate if overlapped on an output page. In general, the clip region represents the largest possible trap region for the edge and may be determined by various methods. The clip region can be extended into the dominant color region, representing, for a color-color edge, the region into which the non-dominant color(s) is spread, and for a color-paper edge, the region from which the non-dominant color(s) is choked.

Once the trapping is complete, the resultant trap data is stored along with the page description data associated with the page. The trap data is stored so that an output device can access both the page data and the corresponding trap data determined for the page. The trap data can be encoded in PDL instructions compatible with the existing page data and be appended to the page data. Alternatively, the trap data can be stored in a separate file. The process continues (step 712) until all the edges have been trapped at which time Phase II of the trapping process ends.

Referring to FIG. 9a, if a vignette is identified as an adjacent object in step 706, then the process of identifying the color of the adjacent region set forth in step 708 may require splitting of an edge that intersects the vignette. More specifically, if the adjacent region is not a vignette (step 720), then the color associated with the adjacent region may be retrieved directly. If the adjacent region is a vignette, the first band in the vignette that intersects the object is identified (step 724). This process can start from the last band in the vignette and proceed backwards searching for the first band that the edge intersects.

Once the first intersecting band has been located, the edge and the band are intersected to identify the edge segments in band that intersect the object (step 726). In the example shown in FIG. 7, band 3 is the last band added to vignette 660 that intersects object 650. For those edges that comprise subpath 662, the color to be trapped for the edge is determined based on the intersection of the edge with the particular vignette bands. If an edge spans only a single band, the color for the edge is determined by the color assigned to the corresponding band in the vignette. If the edge spans two or more bands, then the edge is split into edge segments where each segment intersects no more than a single band in the vignette.

The split segments are added along with the originating band to a segment list (step 728). The segment list is a placeholder for all edges that are to be trapped. In the example shown in FIG. 7, any segments that intersect more than one of sub-path pieces 672, 674 and 676 are split and the resultant split segments are added to the segment list. The color for the intersection of each split segment is then determined (step 730). The process is repeated for each band that intersects the edge (steps 732 and 734). The colors associated with each band is assigned from the originating band to the edge background color.

A plurality of split segments may intersect a band of a vignette. If so, the split segments are sorted by position on the edge. Split segments may also overlap. Overlaps are resolved based on the band number associated with the individual segment. In one implementation, the segment with highest band number controls the color selection. The segment list can be screened for overlaps, and then lower band number segments can be pruned from the segment list. Again, edge background colors for edges stored in segment list are assigned colors based on their originating band.

The processing of elliptical bands can be simplified by computing a transformation matrix which maps the ellipse to a circle The object edge is then mapped with this transformation and splitting proceeds as with a circle. Likewise, processing of rectangular, skewed and stacked shaped vignettes can be simplified when the edge is mapped to a coordinate system in which the principal axis coincides with the orientation of the vignette, i.e., band edges are perpendicular to the principle axis directly providing one coordinate of the edge-band intersection.

Referring now to FIG. 9b, a method of splitting discrete vignettes is shown. Discrete vignettes are stored as a series of polygons as described above. Header data associated with the discrete vignette includes an outline defined by an accumulation of N paths from the N polygons that form the vignette. The color of each of the polygon regions is stored along with information for describing the shape (outline) of the polygon. The process begins by identifying an edge to be split, the "split edge" (950). Edges that are candidates for splitting include all edges that border or cross a discrete vignette. The discrete vignette that intersects the edge is identified (952). A transformation matrix is created that maps the split edge to the positive X-axis (954). Any mapping will suffice (or none at all) but mapping to an axis gives algorithmic efficiency. A list of edges in the N paths of the vignette that cross the X-axis is created (956). Each node in each path is mapped into the same coordinate space as the split edge using the transformation matrix. Any successive nodes that go from +y to −y represent an edge that crosses the X-axis. The crossing test can have a built in offset added or subtracted from each x value when testing split edges on the side of the vignette and for roundoff error.

The list of edges that cross the X-axis is sorted by the x coordinate of the crossing point (958). The object associated with the first edge in the list is added to an active list as an initial entry (959). The active list is used to determine the color to be associated with a given split edge. The active list is a list of objects each of which has associated color data. The active list is sorted by sequence number, with the highest sequence number object stored at the top of the list. As each edge is processed from the list of edges that cross the x-axis, the color for the edge is determined based on the color for the object having the highest sequence number in the active list. Each entry in the list of edges that cross the x-axis is processed. More specifically, as each subsequent edge in the sorted list is encountered, its associated object is added to the active list if its not already present or removed from the active list if it is already present (960).

The color of the vignette side of the split edge (retrieved from the list of edges that cross the x-axis) is set based on the color associated with the object with the highest sequence number in the active list (962). The edge is actually split at the point computed by mapping the X value where the edge crossed the X-axis and a Y value of zero back into the original coordinate space using the inverse transform of the matrix found in step 954. The process continues until the end of the edge to be split is reached (964).

Alternative Imprementations

In the implementation above, the vignette data structure includes parameterized band data for each band in the vignette. Alternatively, the vignette data structure may include a path describing the outline of the vignette and a function defining the color at each point inside of the vignette. The path may be parameterized and represented by parameters that describe the shape of the vignette, similar to the parameterization described above for an individual band of the vignette. The color function may be derived from the color data for each band. A function fit, for example a least squares fit, may be applied to the color data samples to define a color gradient over the vignette region.

The implementation above has been described in terms of a trapping application. The recognition and creation of a vignette is equally well suited to other applications. For example, the PostScript 3™ language supports a smooth shading operator. The smooth shading operator provides a convenient definition of a gradient which may be applied to a shaded region. The smooth shading operator includes a function which defines the transition of colors over the region. A vignette also defines a gradient. A page that includes a gradient may be pre-screened to locate vignettes which may then be transformed into a smooth shading operator for ease of processing in PostScript® compatible printers. In such an implementation, objects for the page are screened for matches that allow for the creation of a vignette. The vignette may be stored as a function and a parametric description of the outline for the vignette. As a final step in the screening process, the vignette may be transformed into a smooth shading operator. PostScript® operator definitions may be found in the technical notes published on the Adobe Systems, Inc., website at www.adobe.com.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device as described herein.

By way of example, FIG. 10 shows a block diagram of a programmable information processing system (computer) 1010. Computer 1010 preferably includes a processor 1020, random access memory (RAM) 1021, a program memory 1022 (preferably a writable read-only memory (ROM) such as a flash ROM) and an input/output (I/O) controller coupled by a CPU bus. Computer 1010 may optionally include a hard drive controller which is coupled to a hard disk and the CPU bus. The hard disk may be used for storing application programs, such as a trapping application described herein, and data. Alternatively, application programs may be stored in RAM or ROM.

The I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) 31 may also be connected to the I/O bus. Programmable processing system 1010 may be preprogrammed or it may be programmed (and reprogrammed) by downloading a program from another source (e.g., a floppy disk, CD-ROM, or another computer).

A printer 1000 may be coupled to programmable processing system 1010 for printing images on an output media. Printer 1000 may include a microprocessor 1002, RAM 1004, ROM 1006 and a printer engine 1008. The RAM or ROM may be used to store application programs, such as a trapping application described herein, and data.

The invention may be embodied in a computer program that is tangibly stored in a machine-readable storage media or device readable by a general or special purpose programmable computer, for configuring and controlling operation of a computer when the storage media or device is read by the computer to perform the procedures described herein. The inventive system may also be considered to be embodied in a computer-readable storage medium 1040, configured with a computer program, where the storage medium so configured causes a computer to operate in a specific and predefined manner to perform the functions described herein.

The present invention has been described in terms of specific embodiments, which are illustrative of the invention and not to be construed as limiting. Other embodiments are within the scope of the following claims.

What is claimed is:

1. A method of trapping objects in a page description language file associated with a page, the method comprising:
   identifying sequential matching objects including determining whether shapes for sequential objects match to determine whether sequential objects are matching;
   combining into a larger object the sequential matching objects including parameterizing each object with a set of parameters including a shape parameter as a band in the larger object, defining an outline for the larger object and defining a function describing a coloring for the larger object; and
   trapping non-matching objects and the larger object.

2. The method of claim 1 where the step of identifying sequential matching objects includes determining if marking operators for sequential objects match.

3. The method of claim 1 where the step of identifying sequential matching objects includes determining if colors for sequential objects match.

4. The method of claim 1 where the step of combining the sequential matching objects includes determining if shapes associated with the identified objects match.

5. The method of claim 1 where each matching object is parameterized according to a set of parameters defining an outline of a given object.

6. The method of claim 1 where the step of trapping includes determining edges of other objects that intersect the larger object and for each intersecting edge splitting the edge into segments corresponding to band edges of the larger object to determine trap data.

7. The method of claim 1 where the step of combining the sequential matching objects includes storing the larger object as series of bands each band stored as a polygon and represented by a set of parameters including a distance, width, step and axis.

8. A method of claim 1 wherein the shape parameter is an identifier for an object shape selected from the group consisting of rectangular shape, skewed shape, stacked shape, circular shape, elliptical shape, and discrete shape.

9. A method of reducing the number and size of objects in a page description language file that is to be trapped for a page, the method comprising:
   identifying sequential objects that match including determining whether shapes for sequential objects match to determine whether sequential objects are matching; and
   combining into a larger object the sequential matching objects prior to trapping including parameterizing each object with a set of parameters including a shape parameter as a band in the larger object, defining an outline for the larger object and a defining a function describing a coloring for the larger object.

10. A method of claim 9 wherein the shape parameter is an identifier for an object shape selected from the group consisting of rectangular shape, skewed shape, stacked shape, circular shape, elliptical shape, and discrete shape.

11. A method of trapping a page description file describing a page to be printed on an output device comprising;
   receiving a page description language file including a plurality of objects describing the page to be printed;
   identifying edges of the objects to be trapped and storing the edges in a list;
   identifying edges in the list that intersect a vignette object;
   splitting the edges that intersect the vignette object into edge segments that intersect no more than one band of the vignette object;
   adding the edge segments to the list; and
   trapping the edges identified in the list.

12. A method of trapping objects in a page description language file associated with a page, the method comprising:
   creating a vignette object from sequential matching objects including defining an outline for the vignette object and a defining a function describing a coloring for the vignette object; and
   using the vignette object for trapping against other objects.

13. A computer program, tangibly stored on a computer-readable medium, for trapping a page description file describing a page to be printed on an output device, the computer program comprising instructions for causing a computer to:
   create a vignette object from sequential matching objects including defining an outline for the vignette object and a defining a function describing a coloring for the vignette object; and
   use the vignette object for trapping against other objects.

* * * * *